United States Patent
Chang et al.

(10) Patent No.: US 11,403,142 B1
(45) Date of Patent: Aug. 2, 2022

(54) BALANCED RESOURCE ALLOCATOR FOR HETEROGENEOUS MULTI-OBJECTIVE SYSTEMS

(71) Applicant: Perspecta Labs Inc., Basking Ridge, NJ (US)

(72) Inventors: Nicholas Chang, Basking Ridge, NJ (US); Mariusz Fecko, Basking Ridge, NJ (US); Clay Smith, Des Moines, IA (US)

(73) Assignee: Peraton Labs Inc., Basking Ridge, NJ (US)

( * ) Notice: Subject to any disclaimer, the term of this patent is extended or adjusted under 35 U.S.C. 154(b) by 214 days.

(21) Appl. No.: 16/883,616

(22) Filed: May 26, 2020

Related U.S. Application Data

(60) Provisional application No. 62/879,058, filed on Jul. 26, 2019.

(51) Int. Cl.
  *G06N 3/08* (2006.01)
  *G06F 9/50* (2006.01)
  *G06F 9/46* (2006.01)
  *H04K 3/00* (2006.01)

(52) U.S. Cl.
  CPC ............ *G06F 9/5011* (2013.01); *G06F 9/466* (2013.01); *G06N 3/08* (2013.01); *H04K 3/20* (2013.01)

(58) Field of Classification Search
  CPC ......... G06F 9/5011; G06F 9/466; G06N 3/08; H04K 3/20
  See application file for complete search history.

(56) References Cited

U.S. PATENT DOCUMENTS

2020/0151554 A1* 5/2020 Siraj ..................... G06N 20/00

OTHER PUBLICATIONS

R. Hassin, Approximation Schemes for the Restricted Shortest Path Problem. Mathematics of Operations Research 17, 1992, 36-42.
H.C Joksch. The shortest route problem with constraints. Journal of Mathematical Analysis and Applications, 14(2):191-197, May 1966.
G. Feng and T. Korkmaz. Finding Multi-Constrained Multiple Shortest Paths (MCSP). IEEE Trans. Computers, 64(9), Sep. 2015.

* cited by examiner

*Primary Examiner* — Jamal Javaid
(74) *Attorney, Agent, or Firm* — Heslin Rothenberg Farley & Mesiti P.C.

(57) ABSTRACT

A computer-implemented method, a system, and a computer program product include program code that obtains, from a controller, temporal objectives and configuration specifications. The program code adjusts weighting for multiple concurrent modes. The program code optimizes each mode of the multiple concurrent modes. The program code discovers conflicts exist between the optimized multiple concurrent modes and resolves the conflicts. The program code allocates resources to the optimized multiple concurrent modes.

20 Claims, 12 Drawing Sheets

For each SSRM epoch $t$, the director: ~610
- With probability $1 - \varepsilon$, determines the best joint action (all modes)
- With prob. $\varepsilon$, selects random feasible action

~620

Best action: $a* = |\max_{a} \sum_{n=1}^{N} w_n Q_{t,n}(a_n, a_{\sim n}, a_n)$ subject to constraints on:

- Power, Time (s): $\sum_{n=1}^{N} Pa_n, s \leq P_{max}$, $\forall s \in [t_{start}, t_{stop}]$ (i.e. current epoch)

- Bandwidth, Time, Apertures ($l$): $\max_{n} \{fa_n, s, l\} - \min_{n} \{fa_n, s, l\} \leq w_l$, $\forall s \in [t_{start}, t_{stop}], l \in L$ (set of apertures)

- Additional switching constraints
- More sophisticated objective functions can be used

FIG. 6

$Q_{t+1,n}(a_n, a_{\sim n}, x_n) = Q_{t,n}(a_n, a_{\sim n}, x_n) + a_t \{ r_t + y Q_{t,n}(b_n, b_{\sim n}, y_n) - Q_{t,n}(a_n, a_{\sim n}, x_n)\}$

- Action for mode n — 710
- Actions for other modes — 720
- State for mode n — 730
- Learning rate — 740
- Reward — 750
- Discount factor — 760
- Next state-action pair — 770

FIG. 7

$$Q_{t,n}(a_{t,n}, \overline{x_{t,n}}) = Q_{t-1,n}(a_{t,n}, \overline{x_{t,n}}) + a_t \{ r_t + yQ_{t-1,n}(a_{t+1,n}, \overline{y_{t+1,n}}) - Q_{t-1,n}(a_{t,n}, \overline{x_{t,n}}) \}$$

Action for mode n at time t
810

State for mode n + compact representation of actions for other modes
820

Learning rate
830

Reward
840

Discount factor
850

Next state-action pair
860

800

BALANCED RESOURCE ALLOCATOR FOR HETEROGENEOUS MULTI-OBJECTIVE SYSTEMS

CROSS-REFERENCED APPLICATION

This application claims priority from U.S. provisional patent application Ser. No. 62/879,058, filed Jul. 26, 2019, entitled "BALANCED MODE RESOURCE ALLOCATOR FOR HETEROGENEOUS MULTI-OBJECTIVE SYSTEMS," which is incorporated herein by reference, in its entirety, for all purposes.

GOVERNMENT RIGHTS STATEMENT

This invention was made with U.S. Government support under contracts HR0011-17-C-0010 and HR0011-19-C-0064 for the Defense Advanced Research Projects Agency (DARPA). The government has certain rights in the invention.

BACKGROUND OF INVENTION

Within a set period of time or within a given situation, in a given situation, including but not limited to, a mission, the objectives and mode priorities can change dynamically due to unexpected events or changing mission controller inputs. Additionally, the level of prior knowledge and environmental dynamics will vary for each situation (e.g., mission), thus, the ability to anticipate and overcome challenges associated with the changes, based on historical information, can be limited. Another consideration is that in some modes of operation, such as certain adversarial situations (including but not limited to an electronic warfare, radar, and/or an adversarial communication link), feedback on the efficacy of a performance of a given mode can be limited.

SUMMARY OF INVENTION

Shortcomings of the prior art are also overcome and additional advantages are provided through the provision of a method for optimized resource controller for a multiple-function system employing different mode types. The method includes: obtaining, by one or more processors, from a controller, temporal objectives and configuration specifications; adjusting, by the one or more processors, based on the objectives and configurations, weighting for multiple concurrent modes; optimizing, by the one or more processors, each mode of the multiple concurrent modes; discovering, by the one or more processors, conflicts exist between the optimized multiple concurrent modes and resolving the conflicts; and allocating, by the one or more processors, resources to the optimized multiple concurrent modes In various embodiments of the present invention, the resources can include, but are not limited to, spectrum, power, antenna, aperture partition, and/or time.

Shortcomings of the prior art are also overcome and additional advantages are provided through the provision of a system for optimized allocation of resources in spectrum, power, time, and space. The system includes: a memory; one or more processors in communication with the memory; program instructions executable by the one or more processors via the memory to perform a method, the method comprising: obtaining by the one or more processors, from a controller, temporal objectives and configuration specifications; adjusting, by the one or more processors, based on the objectives and configurations, weighting for multiple concurrent modes; optimizing, by the one or more processors, each mode of the multiple concurrent modes; discovering, by the one or more processors, conflicts exist between the optimized multiple concurrent modes and resolving the conflicts; and allocating, by the one or more processors, resources to the optimized multiple concurrent modes, wherein the allocating is with regards to resources selected from the group consisting of: frequency, power, time, and space. Space can include both antenna and aperture partition).

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 6 is an illustration of aspects performed by program code of a multi-objective optimization director in some embodiments of the present invention.

FIG. 7 illustrates the learning function aspect of some embodiments of the present invention.

DETAILED DESCRIPTION OF THE INVENTION

Figure 1:
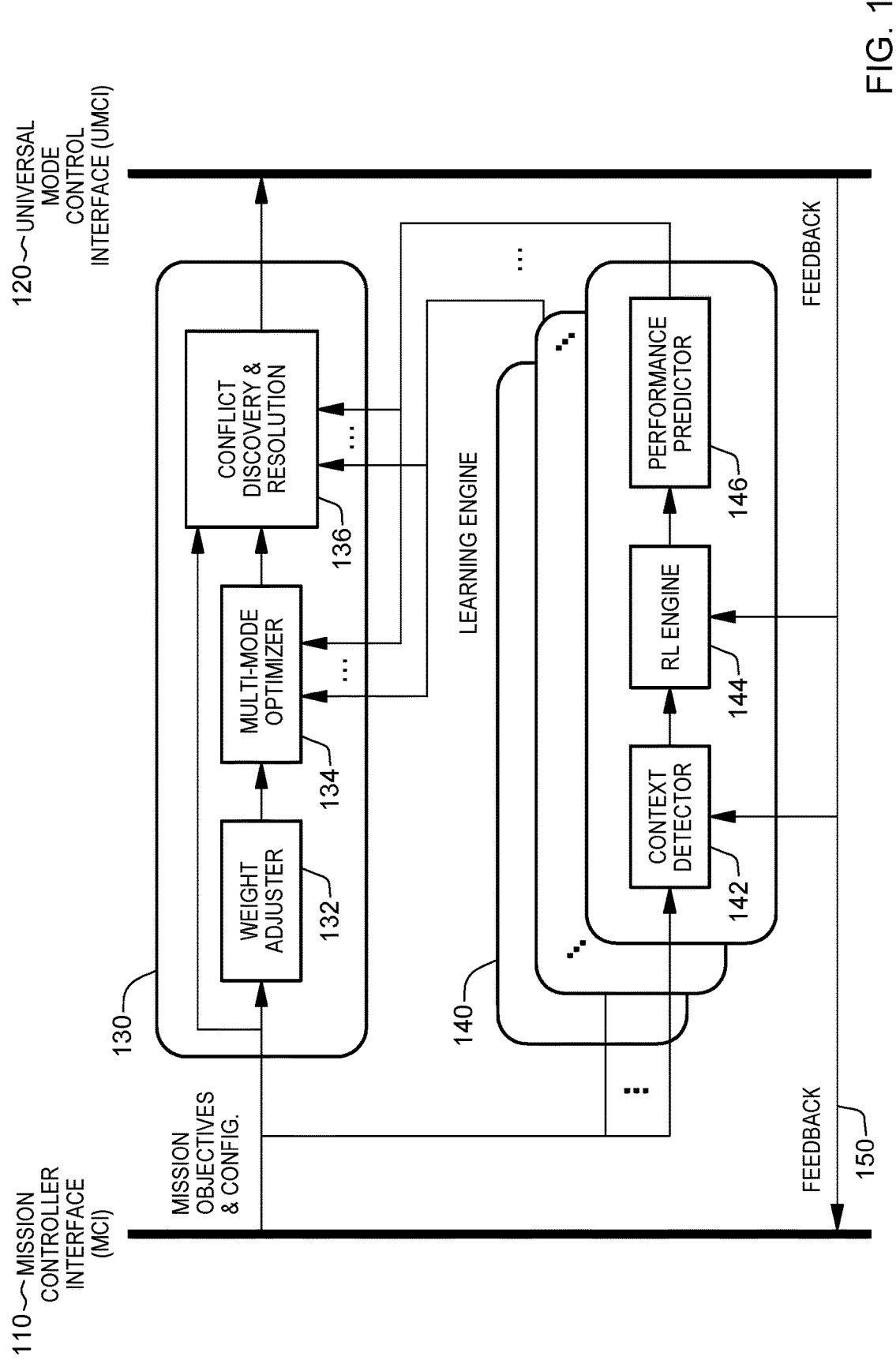
FIG. 1 depicts an overview of certain aspects of the resource allocator in some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, a GPP, an FPGA and a GPU (graphics professor unit). Additionally, items denoted as processors may include hardware and/or software processors or other processing means, including but not limited to a software defined radio and/or custom hardware.

Aspects of various embodiments of the present invention provide balanced radio frequency (RF) resource allocation for heterogeneous multi-objective systems. As such, embodiments of the present invention manage multi-function systems that can support operations, including but not limited to, communications, radar, and/or electronic warfare (EW). EW refers to actions involving the use of the electromagnetic spectrum (EM spectrum) or directed energy to control the spectrum, attack an enemy, or impede enemy assaults. In embodiments of the present invention, program code executing on at least one processing circuit manages resources, including but not limited to, power, time, space (antenna and/or partition), and spectrum. EW is understood to describe any action involving the use of the EM spectrum and/or directed energy to control the spectrum, attack an adversary, or impede adversarial assaults and/or actions. EW activities deny an opponent the advantage of, and ensure friendly unimpeded access to, the EM spectrum. Although certain scenarios within this disclosure describe the use of the described resource allocator in adversarial situations, these examples are utilized merely to provide an exemplary context to describe aspects of the functionality of embodiments of the present invention. Adversarial situations provide functional demands by limiting the reaction timeline and, as described herein, available feedback upon which to base an allocation decision. Thus, these examples are employed to demonstrate the utility of embodiments of the present invention in these more extreme situations, in order to best highlight and contrast the unique aspects of these embodiments.

Embodiments of the present invention include a resource manager (comprising program code executing on at least one processing resource) that obtains information particular to a given time and place (referred to in some settings as "mission information" but also understood throughout as a temporal environment) and performance feedback (contemporaneous with the temporal environment and/or relevant historical information) and selects, among many degrees of freedom, including, but not limited to, (e.g., radio frequency (RF)) mode, frequency, aperture, time, and processing. Example mode types include, but are not limited to, communication, radar, and actions involving the use of the EM spectrum, including those for EW. For brevity, in certain places in this disclosure, various modes are referred to collectively as communication modes. However, these multiple modes, even when only communication modes are mentioned, include operations that include, but are not limited to, communication, radar, and EM spectrum actions. As will be discussed herein, the program code of the resource manager supports multiple concurrent modes, discovers and resolves conflicts between these modes (as needed), balances objectives within the temporal environment, maneuvers in spectrum, space (aperture sharing and partitioning), time, and power, and allocates resources for multiple temporal scenarios.

Embodiments of the present invention provide advantages over existing resource allocation approaches at least because program code in some embodiments of the present invention is portable to different payloads (agnostic to payload details), autonomously adapts to changing temporal mission (or environment) objectives, utilizes machine learning to self-tune to varying prior knowledge and dynamics, considers sequential multi step interaction between modes, and adjusts to available feedback that is contemporaneous in the temporal environment. Embodiments of the present inventions provide various advantages over existing approaches for resource-conflict resolution. The resource-conflict resolution performed in embodiments of the present invention is described in greater detail herein. However, some existing approaches include a constrained shortest path problem with a recursive dynamic programming (DP) approach, an extension of a constrained shortest path problem with a DP cost penalty for conflicts approach, and Multi Constrained Multiple Shortest Paths (MCSP) with a Lagrangian relaxation (LRE) approach. In the first two examples, the approaches are limited to a single resource, the resource type is either exclusively additive or non-additive (respectively), model coupling is not considered, but the complexity is low. With the MCSP example, conflicts can be resolved between multiple resources, but the resources are exclusively additive, mode coupling is not considered, and the complexity is high. In contrast to these existing approaches, the storage specific resource model (SSRM) director (program code) in embodiments of the present invention utilizes an approach (described in greater detail herein) that includes DP with cost penalty, extension of t-path concept to multiple resource constraints, and mode coupling via priority-based ordering. As such, embodiments of the present invention resolve resource conflicts between multiple resources, which can be additive and/or non-addictive, some embodiments of the present invention can utilize mode coupling, and the complexity is low.

Embodiments of the present invention include a computer-implemented method, a computer program product, and a computer system that comprise program code that enables resource allocation for heterogeneous systems, including but not limited to, multi-objective systems. Some embodiments of the present invention allocate radio frequency (RF) resources, although aspects of embodiments of the present invention can be utilized for resource allocation across a variety of RF modes. In allocating resources, program code in embodiments of the present invention: 1) autonomously (e.g., and automatically) adapts to changing mode objectives within a given environment/space/time/period; 2) self-tunes allocation to varying prior knowledge and dynamic data; 3) in allocating resources, considers (and adjusts dynamic allocation) based on sequential multi-step interaction between modes; 4) adjusts allocations based on obtaining (available) feedback; and/or 5) adjusts and operates quickly.

The resource allocator of embodiments of the present invention autonomously adjusts optimization parameters to varying conditions of available model information and environment dynamics using what is referred to as a multi-objective optimization learning engine ("learning engine"). The resource allocator utilizes a structure, the learning engine, which uniquely combines aspects of two optimization approaches, which are utilized in different environments. As discussed in greater detail herein, in embodiments of the present invention, the program code of the learning engine utilizes a form of reinforcement learning (referred to herein as Model-Free Reinforcement Learning (RL)), as RL is effective in unknown but relatively stationary environments to balance learning the optimal allocation of resources with immediate gain. However, when a priori knowledge of the environment exists, program code (of the learning engine) in embodiments of the present invention, instead of RL, utilizes a component similar to a Markov Decision Process (MDP) optimizer. The term "a priori" relates to or denotes reasoning or knowledge which proceeds from theoretical deduction, rather than from observation or experience. As such, the context detector automatically adjusts the horizon optimization length as needed. In some embodiments of the present invention, the program code of the learning engine can combine both of these approaches.

As discussed above, first, in embodiments of the present invention, the program code (of the resource allocator autonomously (e.g., and automatically) adapts to changing objectives within a given environment/space/time/period. Within a given mission and/or temporally varying environment, the objectives and mode priorities can change dynamically, due to unexpected events or changing controller inputs.) In embodiments of the present invention, the program code utilizes an adaptive weight adjuster, which can flexibly handle changing objectives, normalize performance metrics between different modes, and adjust to accommodate attained performance. For example, if an unpredictable jammer disrupts communication in the middle of a temporal environment (e.g., mission) phase, the program code immediately elevates the priority of learning about this signal, and also optimally allocates resources to meet new support goals and any existing objectives for other modes. Within an EW context, in this scenario, the program code provides EW support by learning about this signal, and also optimally allocates resources to meet both the new EW support goal and any existing objectives for other modes.

As aforementioned, second, in embodiments of the present invention, the program code self-tunes allocation to varying prior knowledge and dynamic data. The level of prior knowledge and environmental dynamics, which are known and can be utilized by the learning engines, vary across (mission) environments. In fact, each environment can present unique parameters and challenges. Thus, the learning engines in embodiments of the present invention are a tunable machine learning framework that leverages existing knowledge, when it is available, and, if not, learns environments to identify (e.g., automatically) a level of environmental dynamics in order to switch optimization between long and short time horizons. As discussed above, the learning engine in embodiments of the present invention utilizes a combination of Markov Decision Process (MDP) and Reinforcement Learning (RL) techniques to self-tune the allocations.

Third, as noted above, in allocating resources, the program code considers (and adjusts dynamic allocation) based on sequential multi-step interaction between modes. The learning engine (which can be understood as a RL/MDP component, but is sometimes referred to as one or the other, as shorthand) in embodiments of the present invention balances maximization of immediate performance benefits with longer-term objectives by incorporating the inter-mode benefits into its modeling. For example, in an adversarial situation, the program code can perform sensing of actions involving the use of the EM spectrum, including sensing related to EW, in an initial phase to learn about the adversarial behavior in this context, which can help to improve performance of an EW attack in a later stage. In some embodiments of the present invention, the type of geolocation method selected by the storage specific resource model (SSRM), in a first stage (e.g., time difference of arrival (TDOA), line of bearing (LOB)) can impact the amount of communications data the program code transmits in a later step.

Fourth, the program code in embodiments of the present invention adjusts allocations based on obtaining (available) feedback. This aspect is particularly useful in adversarial situations. For some modes, such as EM spectrum actions involving an EW attack of an adversarial communication or radar link, there can be limited or incomplete feedback information on performance. However, the program code of the learning engine, in embodiments of the present invention, overcomes this unavailability and can therefore allocate resources despite unexpected, missing, and/or incorrect information. In situations where jamming causes a return link to fail, the program code (e.g., the leaning engine) will proceed with decision making and resource allocation, in the absence of feedback.

Finally, as noted above, program code in embodiments of the present invention adjusts and operates quickly. As will be discussed in more detail below, some embodiments of the present invention trade fidelity and computation time. The processing time of the program code in some embodiments of the present invention is fast in part due to its usage of an efficient graph processing algorithm and a decentralized processing approach. When the temporal environment necessitates very fast decision making (e.g., in reaction to a pop-up adversarial signal), the program code (e.g., the learning engine) enables a quick response.

FIG. 1 provides an overview 100 of various aspects of some embodiments of the present invention. For ease of understanding and illustrative purposes, various aspects performed by the program code are separated into modules. As such, FIG. 1 provides a non-limiting example of a possible configuration of functionality of some embodiments of the present invention into modules. As understood by one of skill in the art, the program code and the functions described can be separated and/or combined into one or more modules in various embodiments of the present invention.

Returning to FIG. 1, certain decision-making functions 130 of the program code enable allocation based on these functions 130 being informed by the learning engine 140 of some embodiments of the present invention. As will be discussed in more detail below, the program code of the learning engine provides an output (i.e., $Q_i(a_i,a,x)$), which quantifies the benefits of invoking each mode and configuration, allowing the decision-making functions 130 of the program code to make an allocation decision. As discussed above, embodiments of the present invention allocate resources including, but not limited to, power, time, space (antenna and/or partition), and spectrum. The higher (decision-making) functions 130 and the learning engine 140 are depicted separately for illustrative purposes only and in order to highlight certain functionality. This depiction is not indicative of any structural limitations regarding the modularization of various functionalities of some embodiments of the present invention. Additionally, FIG. 1 uses a given mission as an example of a temporal environment in which embodiments of the present invention can be utilized. This mission is selected for illustrative purposes only.

Referring to FIG. 1, decision-making program code (e.g., functions 130) obtains mission objectives and configurations from an interface, referred to as a mission controller interface 110. The program code allocates the modes via a universal mode control interface 120. As illustrated in FIG. 1, the program code (which can be understood as a director) determines an optimal constrained resource allocation solution with low complexity by performing multiple mode optimization 134 and conflict discovery/resolution 136. In order to allocate the modes in a manner that is optimal for the given mission, the program code adjusts the weights 132 (of the modes) utilizing one or more of current mission objectives and prior performance. The program code optimizes 134 over multiple concurrent modes (the learning engine 140 supports these multiple concurrent modes). The program code discovers and resolves any conflicts 136. This conflict resolution is automatic and can utilize several potential criteria. In some embodiments of the present invention, conflict resolution criteria can be predefined such as an information files or a set of rules.

As illustrated in FIG. 1, in optimizing the multiple modes 134 and discovering and resolving conflicts between these modes 136, the program code is aided by the program code comprising the learning engine 140. The learning engine can utilize feedback 150, if available. As illustrated in FIG. 1, the program code of the learning engine 140 detects a context 142 of an environment (e.g., mission) to automatically identify a level of environmental dynamics in order to switch optimization between long and short time horizons. Hence, the learning engine 140 can adapt to environment changes. The changing context can be obtained by the program code of the learning engine 140, via changes in mission objectives and/or configurations, provided via the mission controller interface 110. The program code of the learning engine adjusts RL 144 based on the availability (levels) of prior info. The program code predicts the performance 146. Thus, the program code of the learning engine 140 enables the program code 130 to allocate resources such as spectrum on a subband basis, and also enable modes to change occupied resources in frequency, time, space, and/or power. The program code comprising the learning engine 140 informs both the optimization 134 and the conflict discovery and resolution 136 functions 130 of the program code.

Referring to FIG. 1, in embodiments of the present invention, a high level function 130 performed by the program code is multi-mode optimization 134. In some embodiments of the present invention, in order to optimize the modes, for each resource manager decision epoch (i.e., subdivision of the geologic timescale that is longer than an age but shorter than a period), the program code determines the best joint action, taking into account all modes, selects a random feasible action, and determines the best action, based on the constraints. These constraints can include, but are not limited to (as represented by functions): 1) power and time; 2) bandwidth, time and apertures; and/or 3) additional switching constraints. In some embodiments of the present invention, more sophisticated objective functions can be used. For example, the function can first maximize highest-priority (e.g., MUST objectives) objectives and then assign any resources to lower priority objectives. FIG. 6 includes all the functional representations of the optimization functionality 134. In FIG. 6, "n" is a given mode. However, the remaining variables are explained herein when the impact of the learning engine 140 on the optimization 134 is described.

Referring to FIG. 6, various aspects of a workflow 600 executed by the program code of a multi-objective optimization director in some embodiments of the present invention are illustrated. For each SSRM epoch, the program code comprising the director: 1) at a given probability determines a best joint action, in all modes; and 2) at a separate probability, selects a random feasible action (610). The program code then determines a best action subject to certain constraints (620). As illustrated in FIG. 6, the best action is subject to various constraints, including, in this example: 1) power, time; 2) bandwidth, time, apertures; 3) additional switching constraints; and 4) more sophisticated functions.

Figure 5:
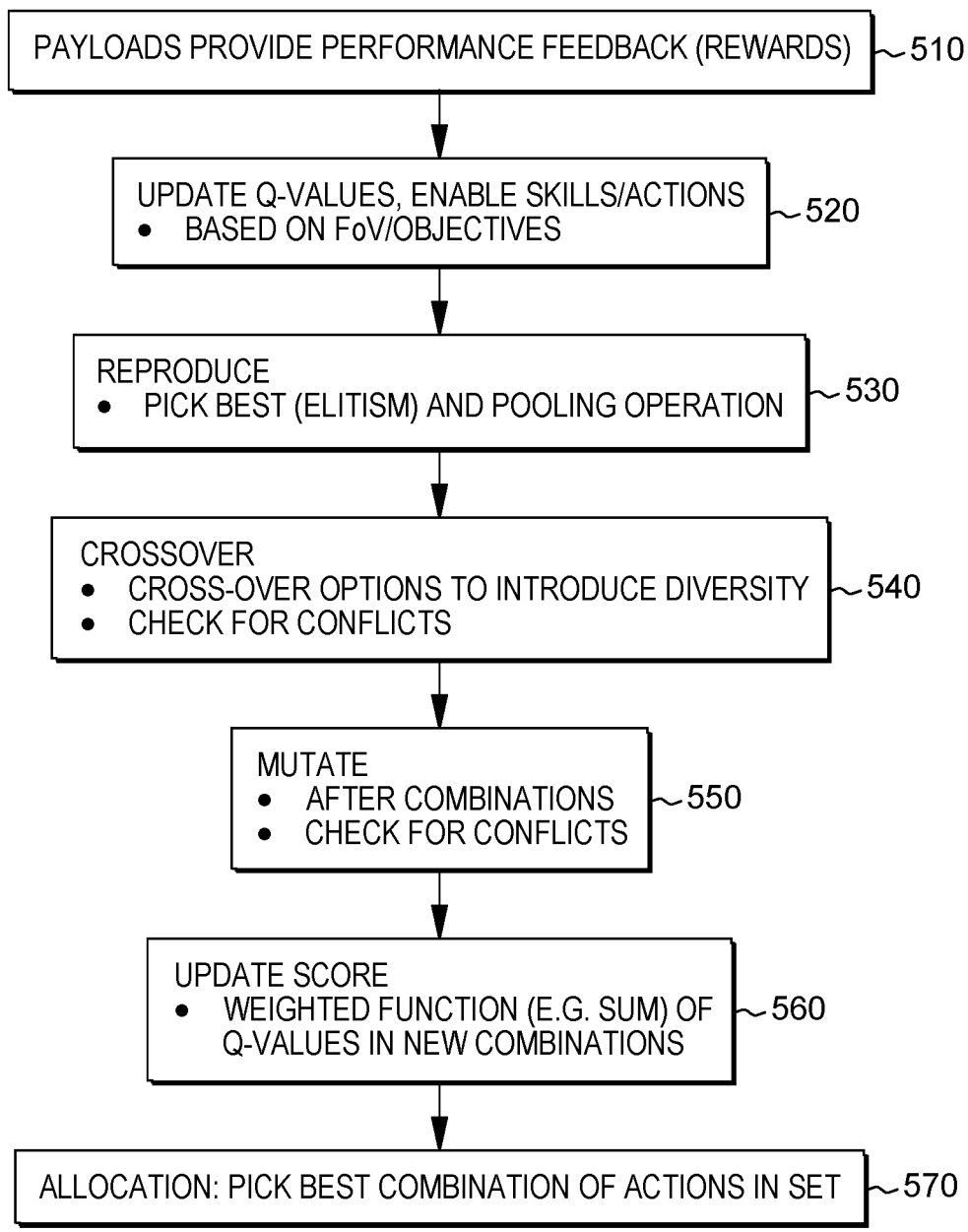
FIG. 5 illustrates various aspects of some embodiments of the present invention.

Referring to FIG. 5, which be discussed below as well, in some embodiments of the present invention, the program code generates a set of options across modes, called a population, as follows. Starting with a population set, which can be randomly initialized, the program code uses a scoring function to measure which members are the best. It keeps a select set of members with the best score (elitism) and using a pooling operation to compare pairs of members and keep the best within each pair. It additionally performs cross-over by mixing different existing members to introduce diversity. It then creates extra members by mutating some options by randomly changing certain elements. In each of the previous steps (elitism, pooling, cross-over, and mutation), the program code checks the generated members for conflicts before insertion into the population. Each mutated option is checked for conflicts to ensure validity (550). The program code computes a score which rates how well each combination can perform when used together, by utilizing a weighted function (e.g., sum) of Q-values in new combinations (560). In embodiments of the present invention, the program code of the learning predicts (multiple mode) performance based on $Q_{t,n}(\bullet,\bullet)$, mode n at time t. Generally speaking, Q-Learning is a value-based reinforcement learning algorithm which is used to find the optimal action-selection policy using a Q function in order to maximize the value function Q. Thus, the program code then allocates to the various modes based on selecting a best combination of actions in the algorithm's set of combinations (570).

Returning to FIG. 1, and as discussed in reference to FIG. 1, the optimization 134 is informed by the learning engine 140. In embodiments of the present invention, the program code of the learning engine 140 (at the RL engine 144 stage) applies a State Action Reward State Action (SARSA) update for a mode, n. The variables in this update are reflected in FIG. 6, in the optimization 134 (FIG. 1). FIG. 7 illustrates the learning function and defines the variables 700. Specifically, FIG. 7 illustrates learning in embodiments of the present invention as Q-function SARSA updates for a mode n. As illustrated in FIG. 7, the learning variables 700 include an action for mode n 710, actions for other modes 720, a state for mode n 730, learning rate 740, a reward 750, a discount factor 760, and a next state-pair action 770.

Figures 8, 9:
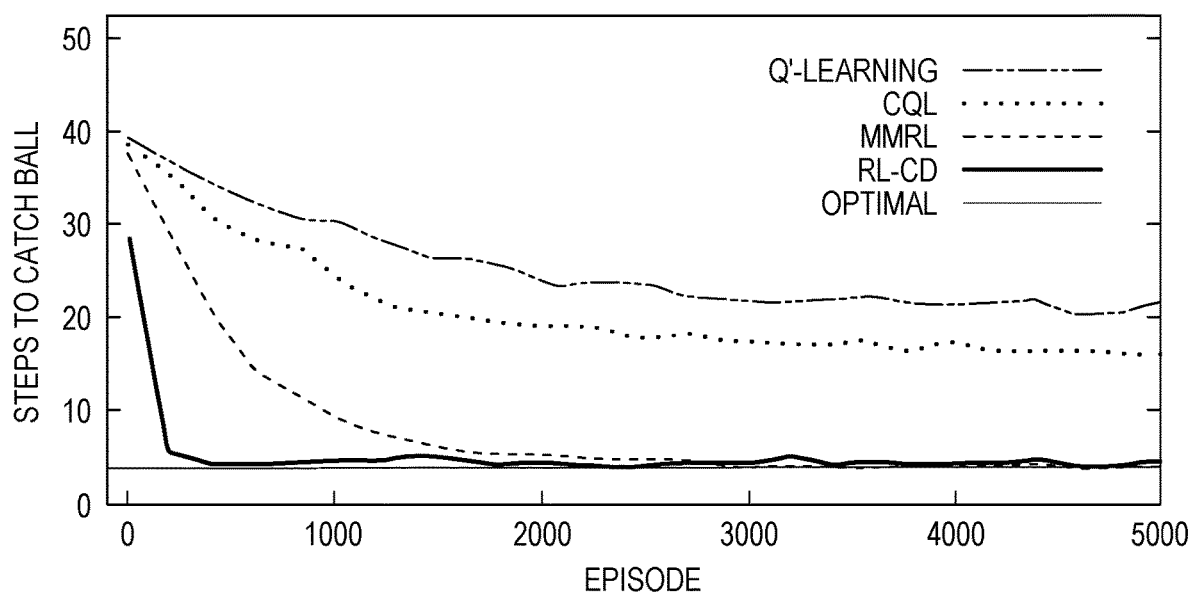
FIG. 8 provides details on the reinforcement learning by illustrating Q-function SARSA updates for each mode n, as executed by program code in some embodiments of the present invention.
FIG. 9 illustrates performance results relevant to certain methods utilized by the program code in some embodiments of the present invention.

Returning, to FIG. 1, in addition to this initial learning phase, in embodiments of the present invention, the program code of the learning engine 140 continuously provides the functions 130 with results of additional or reinforcement learning, to continuously optimize modes 134 (e.g., operations such as communications, radar, and/or actions involving the use of the EM spectrum). The performance prediction 146 of the learning engine 140 utilizes the reinforcement learning. As illustrated in FIG. 1, the program code of the learning engine 140 predicts (multiple mode)

performance 146 based on $Q_n(\cdot,\cdot)$, mode n at time t. In embodiments of the present invention, the program code (e.g., one or more agents) applies the aforementioned SARSA on policy learning rather than Q learning (off policy), since the Q learned value function corresponds to a locally optimal policy, whereas the purpose is to learn a globally optimal policy. In some embodiments of the present invention, each agent does not directly select its own action, but instead receives from the director (see, FIG. 6) an action to be applied. FIG. 8 provides details on the reinforcement learning by illustrating Q-function SARSA updates for each mode n. In comparison to other reinforcement learning approaches for learning Q values, SARSA (State Action Reward State Action) offers a better match for multi agent approaches. Various variables utilized by the program code is the updates 800 are explained in FIG. 8 and include an action for mode n at time t 810, a state for mode n+a compact representation of actions for others modes 820, a learning rate 830, a reward 840, a discount factor 850, and a next state-action pair 860. In other embodiments when the state space (e.g., channel capacity or probability of intercept) is very large (e.g., either continuous-valued or contains more than $10^3$ discrete elements) such that updating individual Q-values would consume excessive time, the program code updates a set of weights $\theta=[\theta_0,\theta_1, \ldots, \theta_n]$ instead of individual Q-values and using the following equation:

$\theta \leftarrow \theta+\alpha[R+\gamma \widehat{Q}(s_{k+1}, a_{k+1}, \theta)- \widehat{Q}(s_k, a_k, \theta)]f(s_k, a_k)^T$. The program code in embodiments of the present invention can then use these weights and employ Q-function approximation at each appropriate RL engine: $\widehat{Q}(s_k, a_k)=\theta_0+\theta_1 f_1(s_k, a_k)+\theta_2 f_2(s_k, a_k)+ \ldots +\theta_n f_n(s_k, a_k)$. The variables in each of these equations is discussed in great details herein as is the functionality employed by the program code by applying these algorithms. In order to select which of approaches to apply based on determining the state space and whether the state space is above a pre-determined threshold value. As an example of advantages of combining reinforcement learning with context detection, as performed by the program code in various embodiments of the present invention, FIG. 9 illustrates performance results of this combination in the context of a moving ball problem.

Referring back to FIG. 1, as discussed above, the learning engine 140 provides the program code with the ability to adjust optimization parameters to varying conditions of available model information and environment dynamics. Meanwhile, FIG. 2 illustrates the changing framework 200 of the learning engine 140 (FIG. 1) based on the absence and/or presence of this information.

Figure 2:
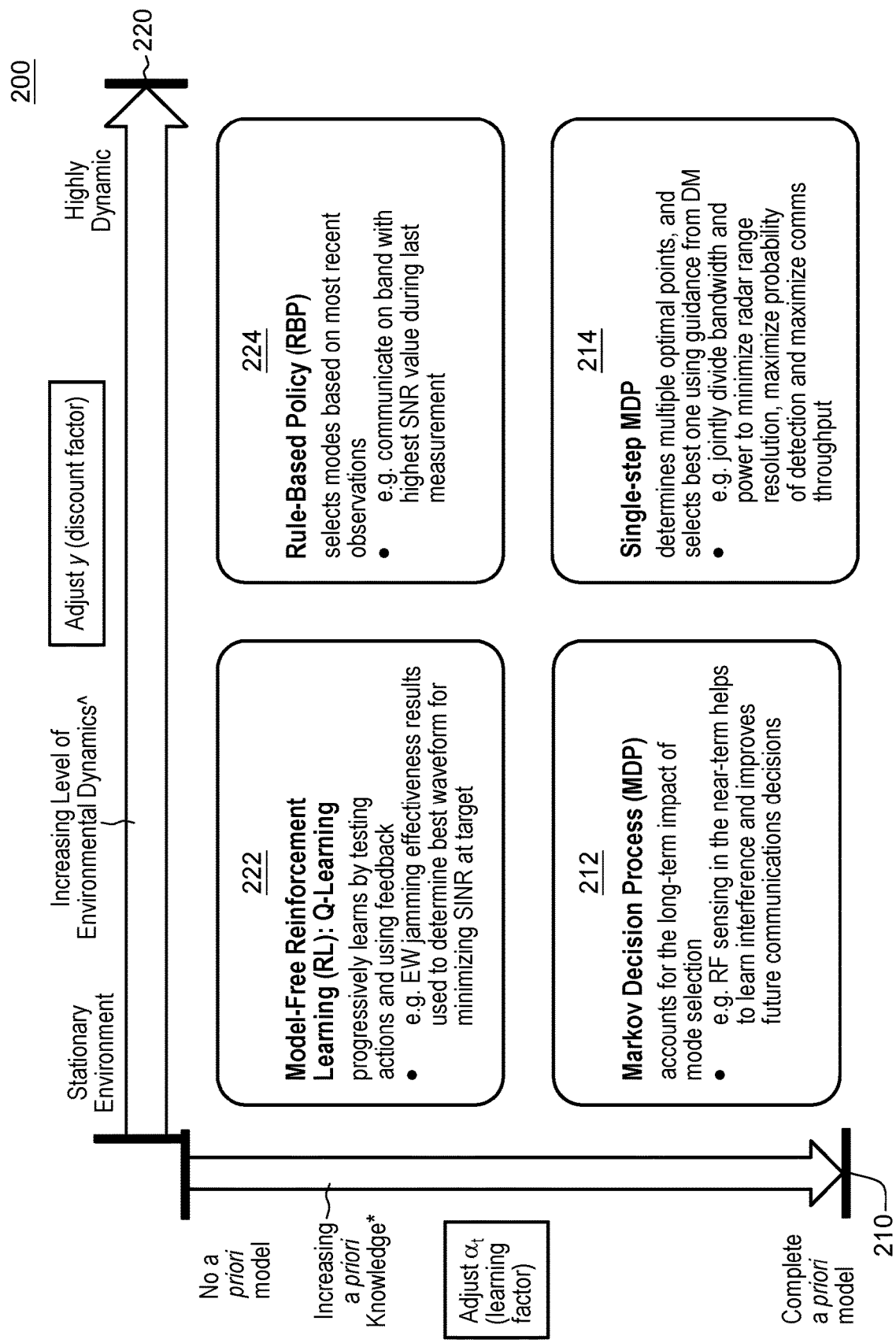
FIG. 2 is an illustration of various aspects of the learning engine functionality in some embodiments of the present invention.

FIG. 2 illustrates the framework 200 of the learning engine 140 (FIG. 1), in which, as aforementioned, program code combines aspects of two optimization approaches, which are utilized by the program code in different environments. The program code of the learning engine utilizes a form of reinforcement learning (referred to herein as Model-Free Reinforcement Learning (RL)), in unknown but relatively stationary environments, and when a priori knowledge of the environment exists, program code in embodiments of the present invention, instead of RL, the program code of the learning engine utilizes a component similar to a Markov Decision Process (MDP) optimizer. FIG. 2 demonstrates that the learning engine adjusts the discount factor as the environmental dynamics increase 220, from stationary to highly dynamic. The learning engine adjusts the learning factor as the a priori knowledge increases 210 from no model, to a complete model. In embodiments of the present invention where the program code of the learning engine detects the context and determines that the temporal environment (e.g., mission) includes a stationary environment and no a priori model is available, the program code performs free RL 222 in which Q Learning progressively learns by testing actions and using feedback. For example, if an EM spectrum related action such as EW is jamming effectiveness results used to determine best waveform for minimizing signal to noise ratio (SNR) at a target. In cases where the program code (by detecting the context) determines that the environment is stationary but a complete a priori model exists, the program code of the learning engine applies a Markov Decision Process (MDP) 212. By utilizing this approach, the program code of the learning engine accounts for the long term impact of mode selection. In this situation, for example, RF sensing in the near term helps to learn interference and improves future resource allocation decisions. In situations where the program code of the learning engine detects the context and determines that no a priori model exists but the environment is highly dynamic, the program code of the learning engine applies a Rule Based Policy (RBP) 224 to select modes based on most recent observations (by the program code). For example, the program code can allocate for communication on a band with a highest SNR value during a last measurement. In some embodiments of the present invention, when the program code of the learning engine detects a highly dynamic environment and a complete a priori model, the program code of the learning engine applies a single step MDP 214 to determine multiple optimal points, and the program code of the learning engine selects the best optimal point, using guidance from functions 130 (FIG. 1), which can be understood as decision-making functions. For example, the program code can determine that an allocation should involve jointly dividing bandwidth and power to minimize radar range resolution, maximize a probability of detection, and maximize communication throughput.

Figure 3:
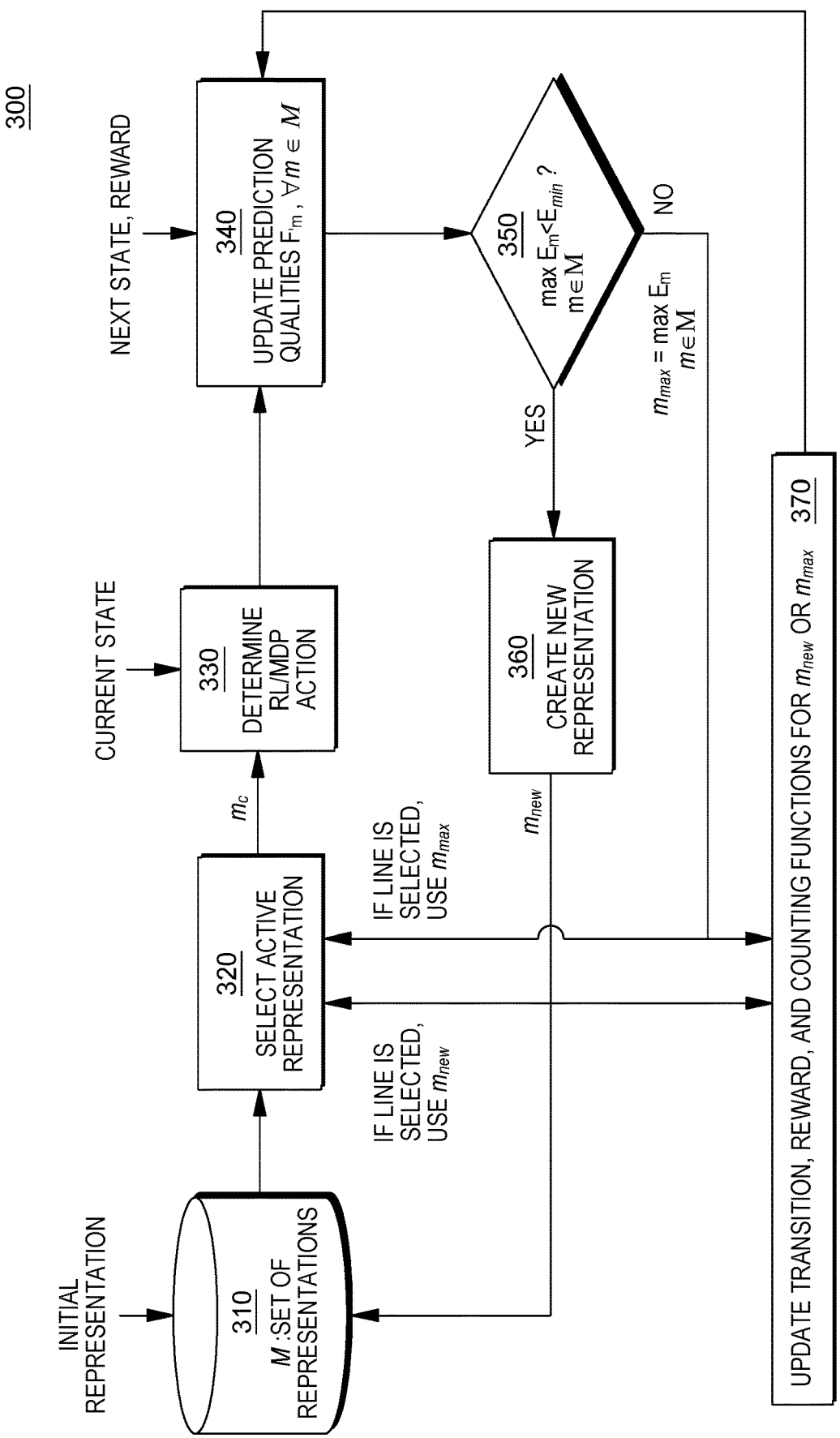
FIG. 3 is a workflow that illustrates various aspects of the learning engine functionality in some embodiments of the present invention.

Referring to FIG. 1, in order for the program code of the learning engine in embodiments of the present invention to determine which approach to utilize, as illustrated in FIG. 1, the program code of the learning engine 140 detects the context 142 of the environment. FIG. 3 is a workflow 300 that details the how the context detection impacts the performance prediction 146 (FIG. 1) by the program code of the learning engine 140 (FIG. 1). As explained earlier, the context detector 142 (FIG. 1) automatically identifies environmental dynamics and switches optimization parameter $\gamma$ (discount factor) to account for differing horizons. By detecting the context and providing a prediction based on this context, the program code can create, update, and/or select one partial environmental representation (i.e., context) among several partial environmental representations in the framework, where each representation has its own transition and reward functions, and horizon lengths.

Turning to FIG. 3, in an embodiment of the present invention, the program code obtains an initial representation of a context, which the program code compares to a set of representations (e.g., several partial environmental representations in the framework) (310). From the representations, the program code selects an active representation (320). Based on the current state, the program code determines the learning engine action (330), which enables a prediction, which is illustrated in FIG. 2 (e.g., RL versus MDP). The program code obtains a next state and updates the prediction. Based on the difference between the states (and the prediction update), the program code determines whether to create a new representation (350). The program code can then generate, based on the results of the determination, a new representation (360). The program code can update the set of representations, based on the new representation. The program code applies one or more of update, transition, reward, and counting functions to select the active representation (320), update the prediction (340), and to determine whether to create a new representation (350).

As demonstrated in FIGS. 1-2 and Tables 1-3, the resource allocator in embodiments of the present invention, utilizes a (director) algorithm to solve constrained multiple objective multiple resource allocation problems. Returning to FIG. 1, the program code can adjust weights 132, to maximize performance function weighted for mission (temporal environment) objectives. To this end, the best action a*, is discovered in multi-mode optimization 134, and represented by Equation 1 below.

$$a^* = \operatorname{argmax} f(\{w_i, Q_i(a_i, a, x)\}_{i=1}^N)\qquad\text{(Equation 1)}$$

Figure 4:
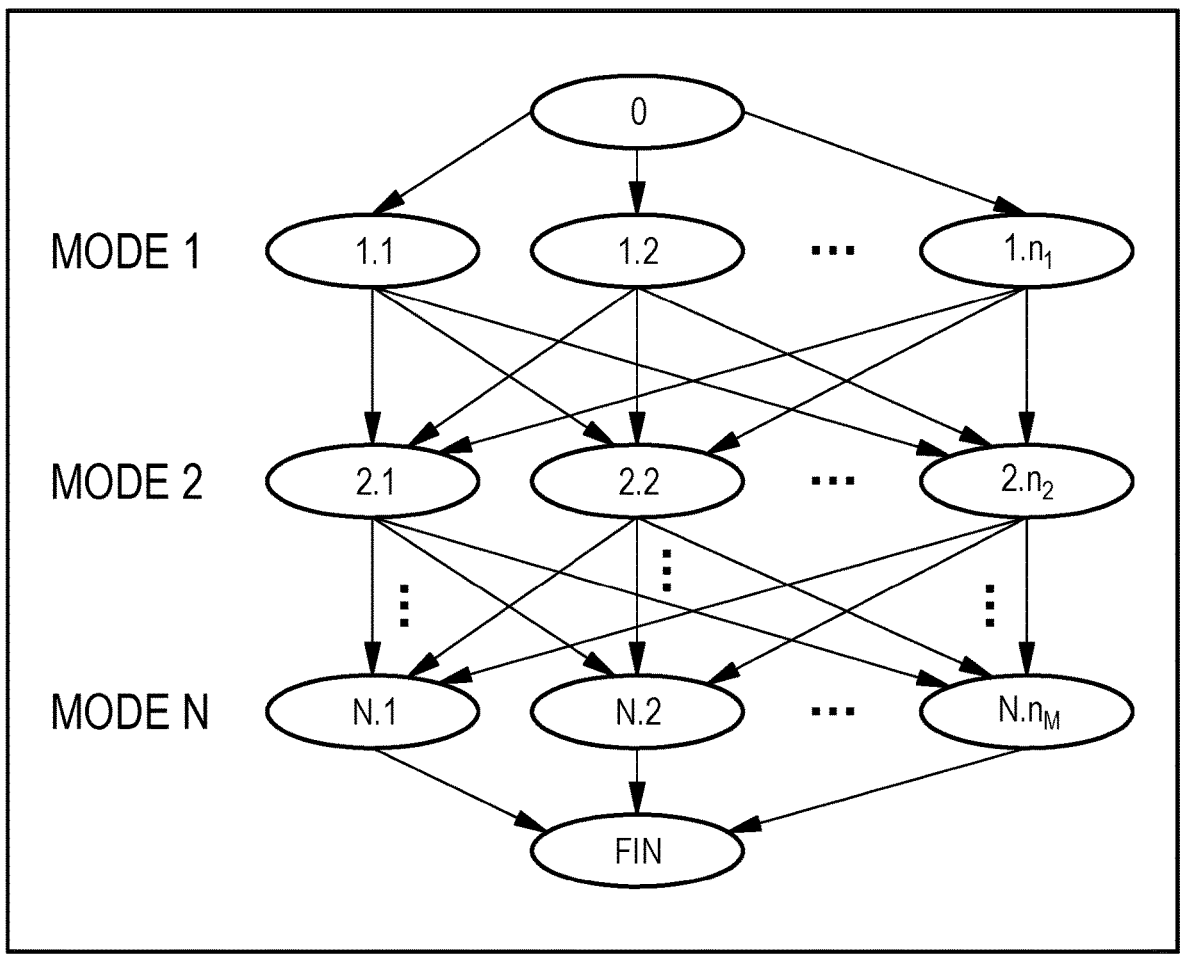
FIG. 4 illustrates various aspects of some embodiments of the present invention.

In Equation 1, f accounts for different objective types (e.g., maximizing RF performance, minimizing power, etc.) and priority types (e.g., ranking). ($a_i$), which was discussed earlier, is output from the learning engines (by the program code/agents of the learning engine) and quantifies the benefits of invoking each mode and configuration. In embodiments of the present invention, the program code also utilizes an efficient graph-based approach for multiple resources and types, supporting both additive (e.g., power) versus non-additive (e.g., apertures, subbands, slots). As such, FIG. 4 illustrates the increased complexities of the multi-mode allocation approach utilized in embodiments of the present invention. Additionally, a graph-based constrained shortest path formulation and search algorithm can be used on FIG. 4 to efficiently determine the optimal configuration of modes. In this manner, embodiments of the present invention can manage resources including power, time, space (antenna and/or partition), and spectrum. As illustrated herein, program code that can be understood as a director program, which performs both the multi-mode optimization (e.g., multiple mode optimization 134 (FIG. 1), FIG. 6) and the conflict/discovery resolution (e.g., conflict discovery/resolution 136 (FIG. 1)) determined optimal resource allocation with low complexity.

In some embodiments of the present invention in order to bound the complexity for scenarios with very large, e.g., more than $10^6$, number of options (e.g., when the program code determines that the number of possible combinations is above a given threshold such as $10^6$), rather than applying a graph algorithm in the multi-mode allocation approach illustrated in FIG. 4, program code in embodiments of the present invention applies a different approach, applying an algorithm illustrated in FIG. 5, rather than the algorithm illustrated in FIG. 4. FIG. 4 is a type of algorithm referred to as a graph algorithm, while the algorithm in FIG. 5 is referred to as a genetic algorithm (GA). Genetic algorithms are commonly used to generate high-quality solutions to optimization and search problems by relying on biologically inspired operators such as mutation, crossover and selection. As illustrated in FIG. 5, program code in embodiments of the present invention performs crossover (540) as well as mutation (550) upon the data and also can utilizes a neural network in the allocation of modes. As such, FIG. 5 illustrates a workflow 500 (algorithm) utilized by the program code for one epoch decision in some embodiments of the present invention. As illustrated in FIG. 5, in some embodiments of the present invention, the program code receives performance feedback from RF systems (510). In some embodiments of the present invention, the program code updates Q-values and enables skills and actions based on FoV and/or objectives (520). The program code reproduces by selecting a best mode and pooling operation (530). The program code performs a crossover to introduce diversity of modes and also checks paths for validity and conflicts by utilizing a conflict detecting neural network and/or other conflict detection function (540).

Figure 10:
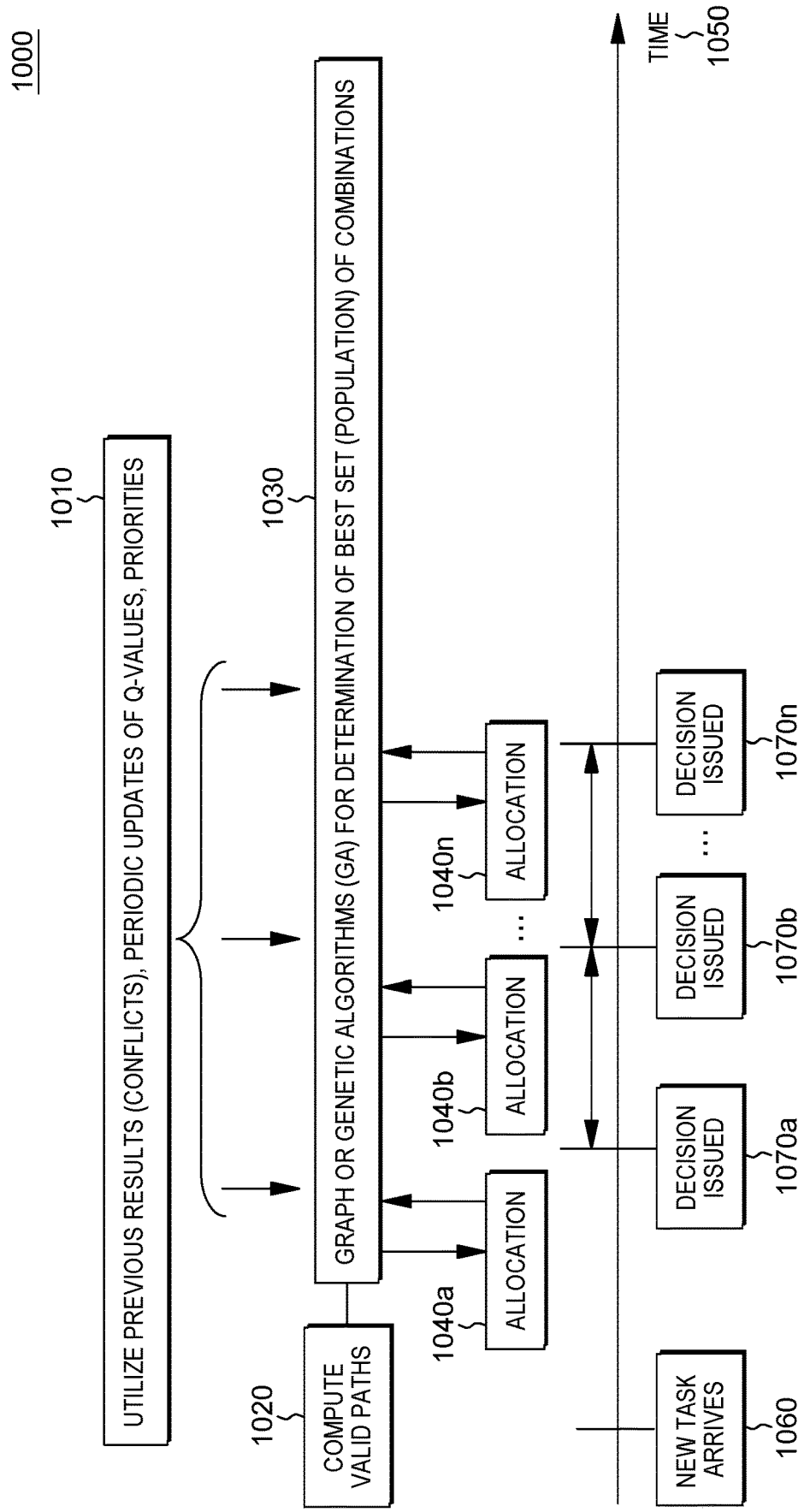
FIG. 10 illustrates various aspects of some embodiments of the present invention on a timeline.

As noted above, adversarial situations provide functional demands by limiting the reaction timeline and, as described herein, available feedback upon which to base an allocation decision. Thus, FIG. 10 illustrates the flow 1000 of the approach of the program code referred to as the director large problem spaces in embodiments of the present invention that employ the algorithms of FIG. 4 or FIG. 5. As illustrated in FIG. 10, in some embodiments of the present invention, program code executing on one or more processors computes valid paths (as discussed earlier, the program code can employ neural networks to make this computation) (1020). As understood by one of skill in the art, neural networks are a biologically-inspired programming paradigm which enables a computer to learn from observational data. This learning is referred to as deep learning, which is a set of techniques for learning in neural networks. Neural networks, including modular neural networks, are capable of pattern recognition with speed, accuracy, and efficiency, in situation where data sets are multiple and expansive, including across a distributed network of the technical environment. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning can provide solutions in computing valid paths (e.g., FIG. 10, 1020).

Returning to FIG. 5, the program code checks the generated members for conflicts before insertion into the population. Each mutated option is checked for conflicts to ensure validity (550). The program code computes a score which rates how well each combination can perform when used together, by utilizing a weighted function (e.g., sum) of Q-values in new combinations (560). The program code then allocates to the various modes based on selecting a best combination of actions in the algorithm's set of combinations (570).

The program code utilizes one of the graph (e.g., FIG. 4) or alternate (e.g., FIG. 5) algorithms by comparing the total number of possible options to a threshold such as $10^6$. When the total number is below this threshold, i.e., less than $10^6$ for example, (e.g., FIG. 10), the program code selects the graph (FIG. 4); otherwise, the program code uses the alternate (FIG. 5) to determine a best set (population) of combinations (of modes) (1030). In this analysis, regardless of the algorithm applied by the program code, the program code utilizes variables including, but not limited to, previous results (conflicts), periodic updates of Q-values, and/or priorities (1010). The program code progressively makes and obtains allocations (1040a-1040n) As illustrated on the time axis 1050, the timing of the mode(s) determination by the program code starts when a new task arrives (i.e., is obtained by the program code) (1060), which, as illustrated herein, can occur in parallel to the program code computing valid paths (1020). Over time 1050, program code comprising a (balanced RF) resource allocator (e.g., for heterogeneous multi-objective systems) issues decisions based upon the allocations by the program code applying one of the algorithms (1070*a*-1070*n*).

Figure 11:
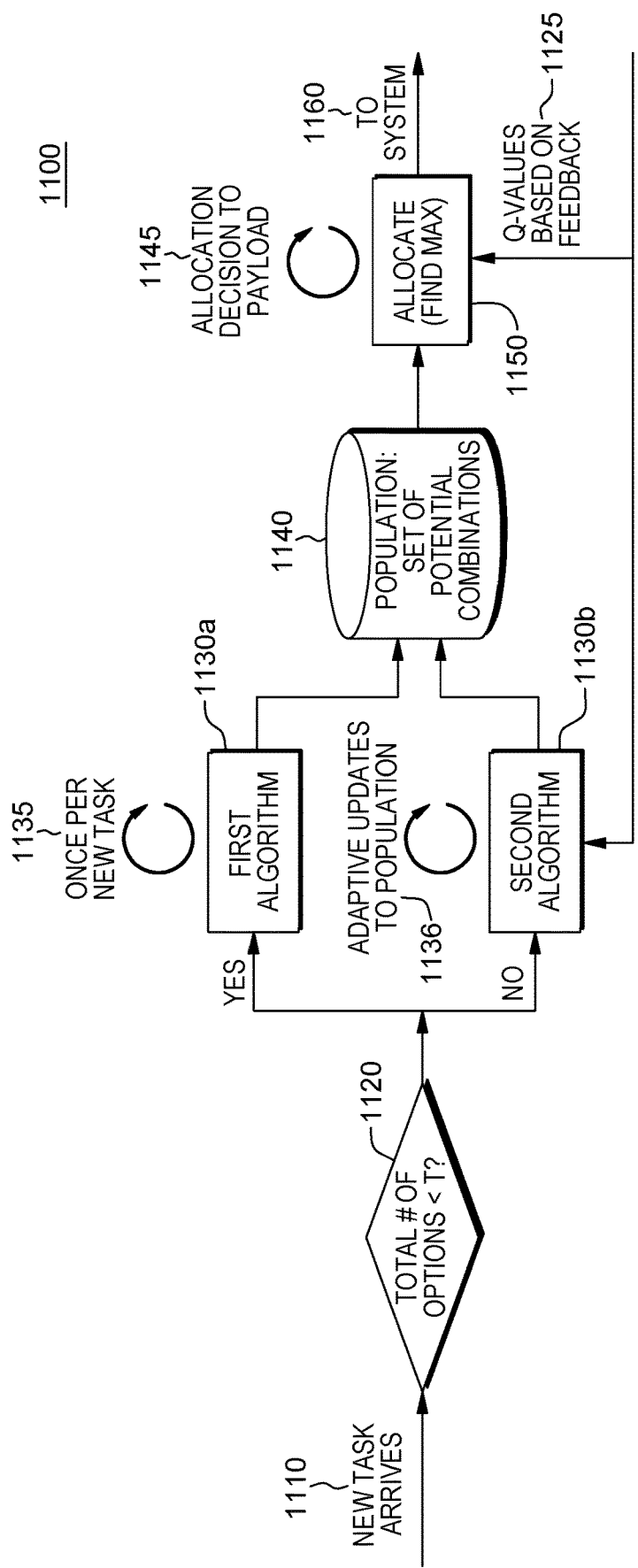
FIG. 11 illustrates certain aspects of some embodiments of the present invention as a workflow.

FIG. 11, like FIG. 10, also illustrates the approach of the program code referred to as the director for large (e.g., more than $10^6$ options) problem spaces in embodiments of the present invention that employ the algorithms of FIG. 4 or FIG. 5 and provides this illustration as a workflow 1100. Certain aspects of some embodiments of the present invention are presented in FIG. 11 is order to enhance the illustration of these aspects of the present invention. As illustrated in the workflow of FIG. 11, in some embodiments of the present invention, a new task arrives (1100) meaning that the program code obtains a new task. The program code determines, from the task if the number of options represented is less than a predetermined threshold (1120). In FIG. 11, this threshold is represented by T. Based on determining that the number of options does not exceed the threshold, the program code applies the graph-based algorithm of FIG. 4, which is referred to as the first algorithm in FIG. 11 (1130*a*). Based on determining that the options are not below the threshold, the program code applies the second algorithm, which is the genetic algorithm on FIG. 5 (1130*b*). Based on applying either the first algorithm or the second algorithm, the program code determines a set of potential combinations for resources (1140). The program code performed an allocation decision to a payload of the system (1145). The population derived by the program code utilizing one or the first or the second algorithm is a set of potential combinations. The program code allocates resources to the optimized multiple concurrent modes (1150). The program code allocates various resources of a given system based on finding a best (max) allocation (1160). Resources to the optimized multiple concurrent modes by the program code include frequency, power, time, and space. As illustrated in FIG. 11, when the program code applies the first algorithm (1130*a*), the program code applies the algorithm once per task (1135). In contrast, the program code consistently makes adaptive updates to a population (1136) in order to apply the second algorithm (1130*b*). To obtain these adaptive updates and apply the second algorithm, the program code obtains Q-values based on feedback (1125). As discussed earlier, the program code of the learning engine can determine the Q-values. Q-learning converges to the optimum action-values (i.e., with probability 1) so long as all actions are repeatedly sampled in all states and the action-values are represented discretely. The Q-values impact the allocation by the program code as well as the results of the program code's application of the second algorithm.

Figure 12:
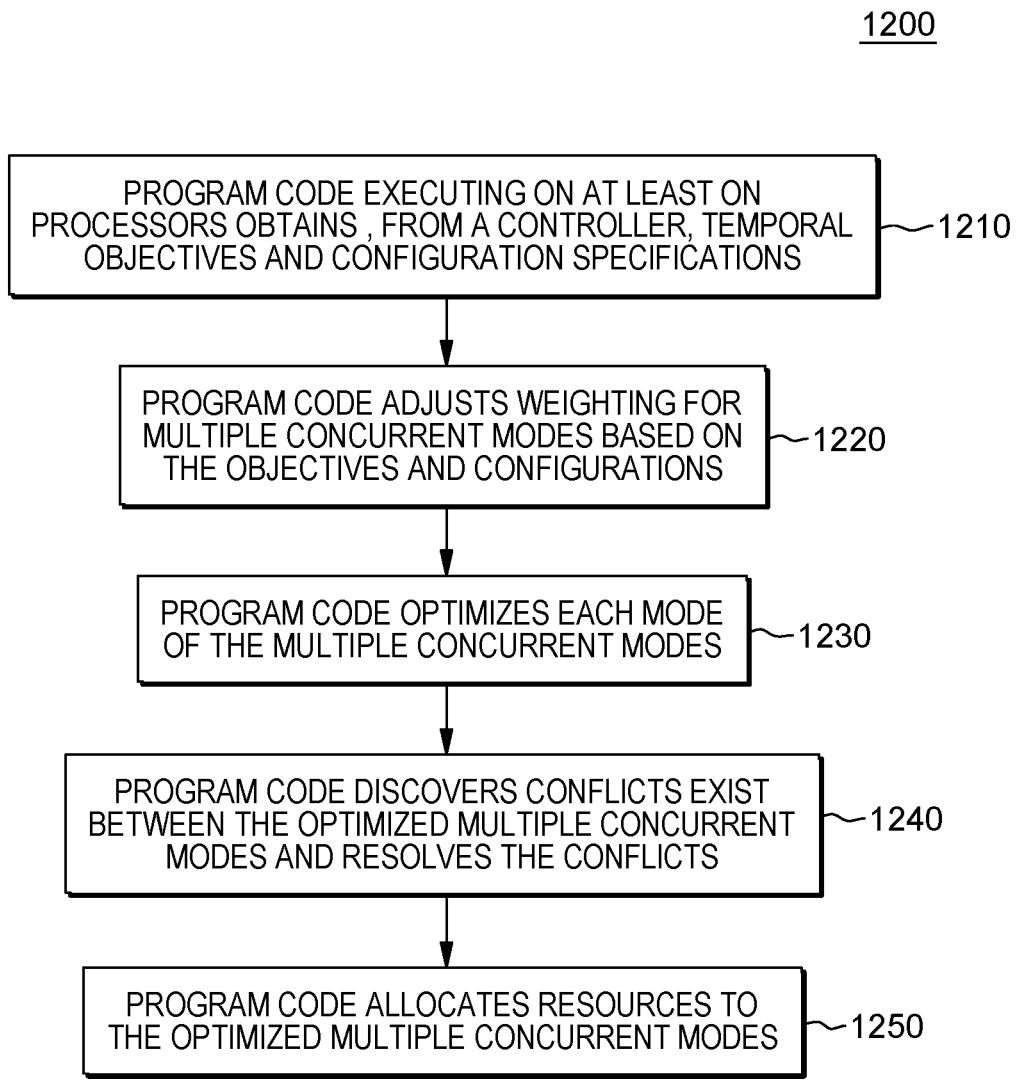
FIG. 12 is a workflow that illustrates various aspects of some embodiments of the present invention.

FIG. 12 is a workflow 1200 that provides as overview of various aspects of some embodiments of the present invention. As illustrated in FIG. 12, in some embodiments of the present invention, program code executing on at least on processors obtains, from a controller, temporal objectives and configuration specifications (1210). These temporal objectives and configuration specifications are relevant to operations, including but not limited to, communications, radar, and/or electronic warfare (EW) relevant to managing a managing multi-function system. The program code adjusts weighting for multiple concurrent modes based on the objectives and configurations (1220). The program code optimizes each mode of the multiple concurrent modes (1230). The program code discovers conflicts exist between the optimized multiple concurrent modes and resolves the conflicts (1240). The program code allocates resources to the optimized multiple concurrent modes (1250).

Embodiments of the present invention include a computer-implemented method, a computer program product, and a computer system where program code executing on one or more processors obtains, from a controller, temporal objectives and configuration specifications. The program code adjusts, based on the objectives and configurations, weighting for multiple concurrent modes. The program code optimizes each mode of the multiple concurrent modes. The program code discovers conflicts exist between the optimized multiple concurrent modes and resolving the conflicts. The program code allocates resources to the optimized multiple concurrent modes.

In some embodiments of the present invention, the multiple concurrent modes comprise multiple concurrent radio frequency (RF) modes.

In some embodiments of the present invention, optimizing each mode of the multiple concurrent modes comprises: the program code computing optimal resource allocation across multiple concurrent RF modes by utilizing a graph-based constrained shortest path approach.

In some embodiments of the present invention, the program code utilizing the graph-based constrained shortest path approach algorithm comprises the program code implementing a graph-based algorithm via dynamic programming.

In some embodiments of the present invention, the program code optimizing each mode of the multiple concurrent modes comprises: the program code obtaining a performance prediction for each mode of the multiple concurrent modes by a learning engine communicatively coupled to the one or more processors.

In some embodiments of the present invention, the program code obtaining the performance prediction comprises: detecting, by the learning engine, a context of the temporal environment; based on the context, determining, by the learning engine, whether to utilize a long time horizon or a short time horizon to utilize in the performance prediction for each for each of the multiple concurrent modes; and formulating the performance prediction based on the selection.

In some embodiments of the present invention, detecting the context comprises determining if the temporal environment is stationary or dynamic.

In some embodiments of the present invention, detecting the context comprises determining if the temporal mode has a priori model.

In some embodiments of the present invention, determining whether to utilize the long time horizon or the short time horizon to utilize in the performance prediction comprises selecting a machine learning policy from the group consisting of: model-free reinforcement learning, a Markov decision process, a rule-based policy, and a single-step Markov decision process.

In some embodiments of the present invention, the model-free reinforcement learning machine learning policy is selected based on detecting the temporal environment is a stationary environment.

In some embodiments of the present invention, the model-free reinforcement learning machine learning policy is selected based on detecting the temporal environment comprises no a priori model.

In some embodiments of the present invention, the Markov decision process machine learning policy is selected based on detecting the temporal environment comprises a completed a priori model.

In some embodiments of the present invention, the rule-based policy machine learning policy is selected based on detecting the temporal environment is a dynamic environment.

In some embodiments of the present invention, the single-step Markov decision process machine learning policy is selected based on detecting the temporal environment is a dynamic environment.

In some embodiments of the present invention, the single-step Markov decision process machine learning policy is selected based on detecting the temporal environment comprises a completed a priori model.

In some embodiments of the present invention, the program code obtains feedback, based on the allocation and re-allocates a portion of the resources, based on the feedback.

Figure 13:
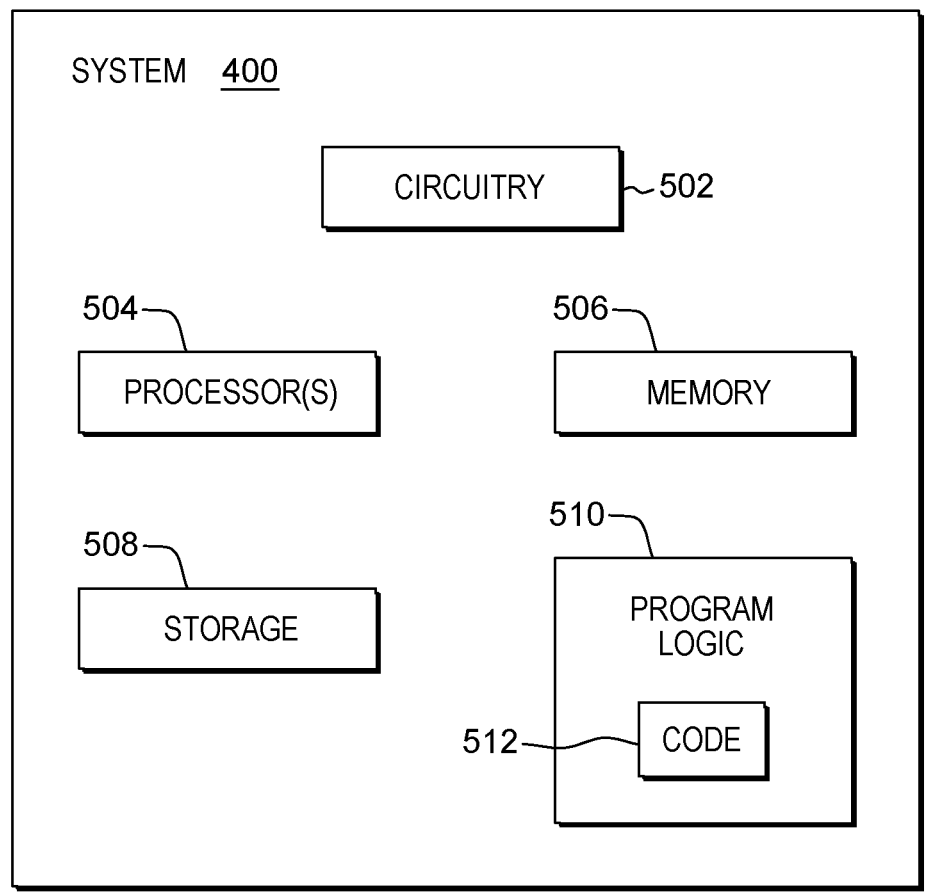
FIG. 13 depicts a computer system configured to perform an aspect of an embodiment of the present invention.

FIG. 13 illustrates a block diagram of a resource 400 in computer system, such as, which is part of the technical architecture of certain embodiments of the technique. Returning to FIG. 13, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 13 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 14:
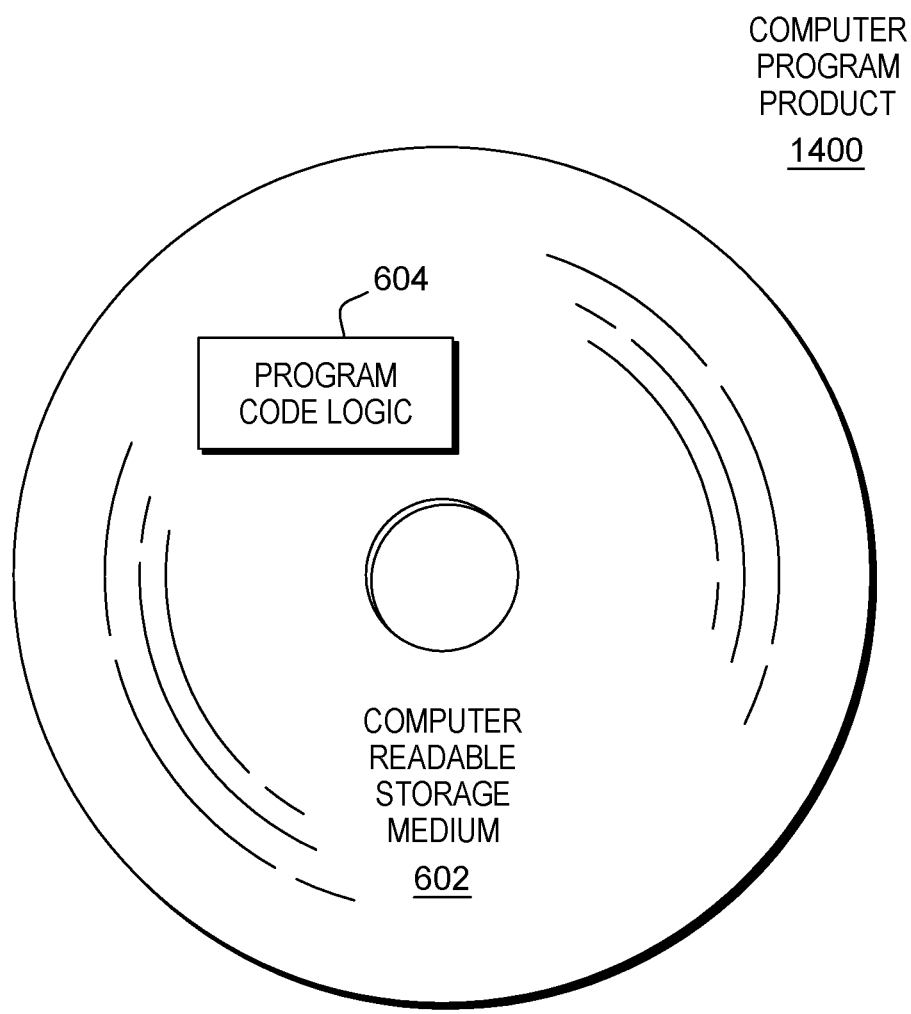
FIG. 14 depicts a computer program product incorporating one or more aspects of the present invention.

Using the processing resources of a resource 400 to execute software, computer-readable code or instructions, does not limit where this code can be stored. Referring to FIG. 14, in one example, a computer program product 1400 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Python, Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:
   obtaining, by one or more processors, from a controller, temporal objectives and configuration specifications;
   adjusting, by the one or more processors, based on the objectives and configurations, weighting for multiple concurrent modes;
   optimizing, by the one or more processors, each mode of the multiple concurrent modes;
   discovering, by the one or more processors, conflicts exist between the optimized multiple concurrent modes and resolving the conflicts; and
   allocating, by the one or more processors, resources to the optimized multiple concurrent modes.

2. The computer-implemented method of claim 1, wherein the multiple concurrent modes comprise multiple concurrent radio frequency (RF) modes.

3. The computer-implemented method of claim 2, wherein optimizing each mode of the multiple concurrent modes comprises:
   computing, by the one or more processors, optimal resource allocation across multiple concurrent RF modes by utilizing a graph-based constrained shortest path approach.

4. The computer-implemented method of claim 3, wherein utilizing the graph-based constrained shortest path approach algorithm comprises implementing a graph-based algorithm via dynamic programming.

5. The computer-implemented method of claim 1, wherein optimizing each mode of the multiple concurrent modes comprises:
   obtaining a performance prediction for each mode of the multiple concurrent modes by a learning engine communicatively coupled to the one or more processors.

6. The computer-implemented method of claim 5, wherein obtaining the performance prediction comprises:
   detecting, by the learning engine, a context of the temporal environment;
   based on the context, determining, by the learning engine, whether to utilize a long time horizon or a short time horizon to utilize in the performance prediction for each for each of the multiple concurrent modes; and
   formulating, by the one or more processors, the performance prediction based on the selection.

7. The computer-implemented method of claim 6, wherein detecting the context comprises determining if the temporal environment is stationary or dynamic.

8. The computer-implemented method of claim 6, wherein detecting the context comprises determining if the temporal mode has a priori model.

9. The computer-implemented method of claim 6, wherein the determining whether to utilize the long time horizon or the short time horizon to utilize in the performance prediction comprises selecting a machine learning policy from the group consisting of: model-free reinforcement learning, a Markov decision process, a rule-based policy, and a single-step Markov decision process.

10. The computer-implemented method of claim 9, wherein the model-free reinforcement learning machine learning policy is selected based on detecting the temporal environment is a stationary environment.

11. The computer-implemented method of claim 9, wherein the model-free reinforcement learning machine learning policy is selected based on detecting the temporal environment comprises no a priori model.

12. The computer-implemented method of claim 9, wherein the Markov decision process machine learning policy is selected based on detecting the temporal environment comprises a completed a priori model.

13. The computer-implemented method of claim 9, wherein the rule-based policy machine learning policy is selected based on detecting the temporal environment is a dynamic environment.

14. The computer-implemented method of claim 9, wherein the single-step Markov decision process machine learning policy is selected based on detecting the temporal environment is a dynamic environment.

15. The computer-implemented method of claim 9, wherein the single-step Markov decision process machine learning policy is selected based on detecting the temporal environment comprises a completed a priori model.

16. The computer-implemented method of claim 1, further comprising:
   obtaining, by the one or more processors, feedback, based on the allocation; and
   re-allocating, by the one or more processors, a portion of the resources, based on the feedback.

17. A system comprising:
   a memory;
   one or more processors in communication with the memory;
   program instructions executable by the one or more processors via the memory to perform a method, the method comprising:
      obtaining, by the one or more processors, from a controller, temporal environment objectives and configuration specifications;
      adjusting, by the one or more processors, based on the objectives and configurations, weighting for multiple concurrent modes;
      optimizing, by the one or more processors, each mode of the multiple concurrent modes;
      discovering, by the one or more processors, conflicts exist between the optimized multiple concurrent modes and resolving the conflicts; and
      allocating, by the one or more processors, resources to the optimized multiple concurrent modes, wherein the allocating enables the optimized multiple concurrent modes to change the occupied resources.

18. The system of claim 17, wherein the optimizing is based on obtaining a performance prediction for each of the multiple concurrent modes by a learning engine communicatively coupled to the one or more processors.

19. The system of claim 18, wherein obtaining the performance prediction comprises:
   detecting, by the learning engine, a context of the temporal environment;
   based on the context, determining, by the learning engine, whether to utilize a long time horizon or a short time horizon to utilize in the performance prediction for each for each of the multiple concurrent modes; and
   formulating, by the one or more processors, the performance prediction based on the selection.

20. A computer program product comprising:
   a non-transitory computer readable storage medium readable by one or more processors and storing instructions for execution by the one or more processors for performing a method comprising:
   obtaining, by the one or more processors, from a controller, temporal environment objectives and configuration specifications;
   adjusting, by the one or more processors, based on the objectives and configurations, weighting for multiple concurrent modes;
   optimizing, by the one or more processors, each mode of the multiple concurrent modes;
   discovering, by the one or more processors, conflicts exist between the optimized multiple concurrent modes and resolving the conflicts; and
   allocating, by the one or more processors, resources to the optimized multiple concurrent modes, wherein the allocation enables the optimized multiple concurrent modes to change the occupied resources.

* * * * *